US012528317B2

(12) United States Patent
Shimamura et al.

(10) Patent No.: US 12,528,317 B2
(45) Date of Patent: Jan. 20, 2026

(54) PNEUMATIC TIRE

(71) Applicants: The Yokohama Rubber Co., LTD., Kanagawa (JP); SHANDONG XINGDA TYRE CO. LTD., Shandong (CN)

(72) Inventors: Atsushi Shimamura, Kanagawa (JP); Yukihito Yamaguchi, Kanagawa (JP); Mingquan Wang, Shandong (CN); Feng Gao, Shandong (CN); Xueqin Jiang, Shandong (CN)

(73) Assignees: The Yokohama Rubber Co., LTD., Tokyo (JP); SHANDONG XINGDA TYRE CO. LTD., Shandong (CN)

( * ) Notice: Subject to any disclaimer, the term of this patent is extended or adjusted under 35 U.S.C. 154(b) by 0 days.

(21) Appl. No.: 19/103,109

(22) PCT Filed: Aug. 16, 2022

(86) PCT No.: PCT/CN2022/112760
§ 371 (c)(1),
(2) Date: Feb. 11, 2025

(87) PCT Pub. No.: WO2024/036477
PCT Pub. Date: Feb. 22, 2024

(65) Prior Publication Data
US 2025/0256534 A1    Aug. 14, 2025

(51) Int. Cl.
*B60C 15/04*    (2006.01)
*B60C 15/06*    (2006.01)

(52) U.S. Cl.
CPC .......... *B60C 15/04* (2013.01); *B60C 15/0628* (2013.01); *B60C 2015/046* (2013.01)

(58) Field of Classification Search
CPC ................ B60C 15/04; B60C 15/0653; B60C 2015/046; B60C 2015/048
See application file for complete search history.

(56) References Cited

U.S. PATENT DOCUMENTS

| 11,040,580 B2 | 6/2021 | Kouda et al. |
| 2009/0056851 A1 | 3/2009 | Maruoka |
| | (Continued) | |

FOREIGN PATENT DOCUMENTS

| CN | 105793071 A | 7/2016 |
| CN | 107804122 A | 3/2018 |
| | (Continued) | |

OTHER PUBLICATIONS

Decision to Grant a Patent dated on Dec. 17, 2024 in Japan patent application No. 2023-504712.

*Primary Examiner* — Blaine Copenheaver
*Assistant Examiner* — Thomas Frank Schneider
(74) *Attorney, Agent, or Firm* — Thorpe North & Western

(57) ABSTRACT

A pneumatic tire includes a bead core including end portions in a width direction formed as a vertical line along a radial direction, the vertical line has a length of 31% to 45% of a core height, in two adjacent bead core layers of first, second and third layers of the bead core, the number of bead wires in the radially outer layer is larger by two or more than the number of bead wires in the radially inner layer, and a misalignment amount between bead wires located at an end portion on one side in the width direction is one-half of the bead wire, and a side on which the one-half misalignment amount between the bead wires in the first and second layers is opposite in the width direction to a side of the one-half misalignment amount between the second and third layer bead wires.

7 Claims, 11 Drawing Sheets

(56) References Cited

U.S. PATENT DOCUMENTS

| | | | |
|---|---|---|---|
| 2012/0211138 A1* | 8/2012 | Johnson | B60C 15/06 152/526 |
| 2013/0220506 A1* | 8/2013 | Pottier | B60C 9/005 57/210 |
| 2018/0056719 A1 | 3/2018 | Bishop | |
| 2018/0370295 A1* | 12/2018 | Nishio | B60C 15/0653 |
| 2019/0359011 A1 | 11/2019 | Tauchi | |
| 2020/0156418 A1 | 5/2020 | Nishio | |
| 2020/0369097 A1 | 11/2020 | Tauchi | |
| 2020/0376903 A1 | 12/2020 | Kouda et al. | |
| 2021/0107321 A1 | 4/2021 | Tauchi | |
| 2022/0324269 A1 | 10/2022 | Reix et al. | |

FOREIGN PATENT DOCUMENTS

| | | | |
|---|---|---|---|
| CN | 108367637 A | | 8/2018 |
| CN | 111699097 A | | 9/2020 |
| CN | 111712388 A | | 9/2020 |
| CN | 111936327 A | | 11/2020 |
| CN | 114302813 A | | 4/2022 |
| FR | 3029844 A1 | | 6/2016 |
| JP | 02-256503 A | | 10/1990 |
| JP | H09-240223 A | | 9/1997 |
| JP | H09254611 A | * | 9/1997 |
| JP | H09254611 A1 | | 9/1997 |
| JP | 2005-088793 A | | 4/2005 |
| JP | 2006-199221 A | | 8/2006 |
| JP | 2007-55465 A | | 3/2007 |
| JP | 2007055465 A | * | 3/2007 |
| JP | 4243091 B2 | | 3/2009 |
| JP | 2010-006322 A | | 1/2010 |
| JP | 2012-254736 A | | 12/2012 |
| JP | 2014-172412 A | | 9/2014 |
| JP | 2014-237353 A | | 12/2014 |
| JP | 2018-034784 A | | 3/2018 |
| JP | 2018-34784 A | | 3/2018 |
| JP | 2018079931 A | | 5/2018 |
| JP | 2018-114843 A | | 7/2018 |
| JP | 2018-118553 A | | 8/2018 |
| JP | 2019-99056 A | | 6/2019 |
| JP | 2019-099056 A | | 6/2019 |
| JP | 2019-151301 A | | 9/2019 |
| JP | 2020-131873 A | | 8/2020 |
| JP | 2020-163898 A | | 10/2020 |
| WO | WO 2019/155787 A1 | | 8/2019 |
| WO | WO 2019/194257 A1 | | 10/2019 |

* cited by examiner

| | CONVENTIONAL EXAMPLE | EXAMPLE 1 | EXAMPLE 2 | EXAMPLE 3 |
|---|---|---|---|---|
| BEAD CORE HAS VERTICAL LINES ON INNERMOST SIDE AND OUTERMOST SIDE IN TIRE WIDTH DIRECTION | × | ○ | ○ | ○ |
| RATIO OF VERTICAL LINE LENGTH Cv TO CORE HEIGHT CH | N/A | 31% | 45% | 45% |
| RATIO OF DISTANCE Va FROM BEAD CORE BOTTOM SURFACE TO INNER END PORTION OF VERTICAL LINE TO CORE HEIGHT CH | N/A | 35% | 35% | 20% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | × | ○ | ○ | ○ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | × | ○ | ○ | ○ |
| RATIO OF WIDTH CBW OF BEAD CORE BOTTOM SURFACE TO MAXIMUM WIDTH CW OF BEAD CORE | 72% | 72% | 71% | 71% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 30% | 30% | 30% | 30% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 30% | 30% | 30% | 30% |
| RATIO OF MAXIMUM WIDTH CW OF BEAD CORE TO CORE HEIGHT CH | 1.5 TIMES | 1.5 TIMES | 1.5 TIMES | 1.5 TIMES |
| NUMBER OF ENDS (CORDS PER 50 mm) OF CARCASS CORDS AT POSITION ON INNER SIDE OF BEAD CORE IN TIRE WIDTH DIRECTION | 9 | 9 | 9 | 9 |
| BREAKAGE INDEX OF BEAD PORTION CARCASS WIRE | 100 | 110 | 111 | 111 |

FIG. 6A

| | EXAMPLE 4 | EXAMPLE 5 | EXAMPLE 6 | EXAMPLE 7 |
|---|---|---|---|---|
| BEAD CORE HAS VERTICAL LINES ON INNERMOST SIDE AND OUTERMOST SIDE IN TIRE WIDTH DIRECTION | ○ | ○ | ○ | ○ |
| RATIO OF VERTICAL LINE LENGTH CV TO CORE HEIGHT CH | 45% | 38% | 38% | 38% |
| RATIO OF DISTANCE Va FROM BEAD CORE BOTTOM SURFACE TO INNER END PORTION OF VERTICAL LINE TO CORE HEIGHT CH | 20% | 28% | 28% | 28% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | ○ | ○ | ○ | ○ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | ○ | ○ | ○ | ○ |
| RATIO OF WIDTH CBW OF BEAD CORE BOTTOM SURFACE TO MAXIMUM WIDTH CW OF BEAD CORE | 44% | 71% | 70% | 45% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 30% | 30% | 30% | 30% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 30% | 30% | 30% | 30% |
| RATIO OF MAXIMUM WIDTH CW OF BEAD CORE TO CORE HEIGHT CH | 1.5 TIMES | 1.5 TIMES | 1.5 TIMES | 1.5 TIMES |
| NUMBER OF ENDS (CORDS PER 50 mm) OF CARCASS CORDS AT POSITION ON INNER SIDE OF BEAD CORE IN TIRE WIDTH DIRECTION | 9 | 9 | 9 | 9 |
| BREAKAGE INDEX OF BEAD PORTION CARCASS WIRE | 112 | 115 | 120 | 122 |

FIG. 6B

| | EXAMPLE 8 | EXAMPLE 9 | EXAMPLE 10 | EXAMPLE 11 |
|---|---|---|---|---|
| BEAD CORE HAS VERTICAL LINES ON INNERMOST SIDE AND OUTERMOST SIDE IN TIRE WIDTH DIRECTION | ○ | ○ | ○ | ○ |
| RATIO OF VERTICAL LINE LENGTH CV TO CORE HEIGHT CH | 38% | 38% | 38% | 38% |
| RATIO OF DISTANCE Va FROM BEAD CORE BOTTOM SURFACE TO INNER END PORTION OF VERTICAL LINE TO CORE HEIGHT CH | 28% | 28% | 28% | 28% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | ○ | ○ | ○ | ○ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | ○ | ○ | ○ | ○ |
| RATIO OF WIDTH CBW OF BEAD CORE BOTTOM SURFACE TO MAXIMUM WIDTH CW OF BEAD CORE | 45% | 58% | 58% | 58% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 8% | 8% | 25% | 10% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 30% | 30% | 30% | 30% |
| RATIO OF MAXIMUM WIDTH CW OF BEAD CORE TO CORE HEIGHT CH | 1.5 TIMES | 1.5 TIMES | 1.5 TIMES | 1.5 TIMES |
| NUMBER OF ENDS (CORDS PER 50 mm) OF CARCASS CORDS AT POSITION ON INNER SIDE OF BEAD CORE IN TIRE WIDTH DIRECTION | 9 | 9 | 9 | 9 |
| BREAKAGE INDEX OF BEAD PORTION CARCASS WIRE | 122 | 125 | 130 | 132 |

FIG. 6C

| | EXAMPLE 12 | EXAMPLE 13 | EXAMPLE 14 | EXAMPLE 15 |
|---|---|---|---|---|
| BEAD CORE HAS VERTICAL LINES ON INNERMOST SIDE AND OUTERMOST SIDE IN TIRE WIDTH DIRECTION | ○ | ○ | ○ | ○ |
| RATIO OF VERTICAL LINE LENGTH CV TO CORE HEIGHT CH | 38% | 38% | 38% | 38% |
| RATIO OF DISTANCE Va FROM BEAD CORE BOTTOM SURFACE TO INNER END PORTION OF VERTICAL LINE TO CORE HEIGHT CH | 28% | 28% | 28% | 28% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | ○ | ○ | ○ | ○ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | ○ | ○ | ○ | ○ |
| RATIO OF WIDTH CBW OF BEAD CORE BOTTOM SURFACE TO MAXIMUM WIDTH CW OF BEAD CORE | 58% | 58% | 58% | 58% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 10% | 18% | 18% | 18% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 8% | 8% | 25% | 10% |
| RATIO OF MAXIMUM WIDTH CW OF BEAD CORE TO CORE HEIGHT CH | 1.5 TIMES | 1.5 TIMES | 1.5 TIMES | 1.5 TIMES |
| NUMBER OF ENDS (CORDS PER 50 mm) OF CARCASS CORDS AT POSITION ON INNER SIDE OF BEAD CORE IN TIRE WIDTH DIRECTION | 9 | 9 | 9 | 9 |
| BREAKAGE INDEX OF BEAD PORTION CARCASS WIRE | 131 | 135 | 140 | 142 |

FIG. 6D

| | EXAMPLE 16 | EXAMPLE 17 | EXAMPLE 18 | EXAMPLE 19 |
|---|---|---|---|---|
| BEAD CORE HAS VERTICAL LINES ON INNERMOST SIDE AND OUTERMOST SIDE IN TIRE WIDTH DIRECTION | ◯ | ◯ | ◯ | ◯ |
| RATIO OF VERTICAL LINE LENGTH CV TO CORE HEIGHT CH | 38% | 38% | 38% | 38% |
| RATIO OF DISTANCE Va FROM BEAD CORE BOTTOM SURFACE TO INNER END PORTION OF VERTICAL LINE TO CORE HEIGHT CH | 28% | 28% | 28% | 28% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | ◯ | ◯ | ◯ | ◯ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | ◯ | ◯ | ◯ | ◯ |
| RATIO OF WIDTH CBW OF BEAD CORE BOTTOM SURFACE TO MAXIMUM WIDTH CW OF BEAD CORE | 58% | 58% | 58% | 58% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 18% | 18% | 18% | 18% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 10% | 18% | 18% | 18% |
| RATIO OF MAXIMUM WIDTH CW OF BEAD CORE TO CORE HEIGHT CH | 0.8 TIMES | 0.8 TIMES | 0.9 TIMES | 1.4 TIMES |
| NUMBER OF ENDS (CORDS PER 50 mm) OF CARCASS CORDS AT POSITION ON INNER SIDE OF BEAD CORE IN TIRE WIDTH DIRECTION | 9 | 9 | 9 | 9 |
| BREAKAGE INDEX OF BEAD PORTION CARCASS WIRE | 142 | 145 | 150 | 152 |

FIG. 6E

| | EXAMPLE 20 | EXAMPLE 21 | EXAMPLE 22 | EXAMPLE 23 |
|---|---|---|---|---|
| BEAD CORE HAS VERTICAL LINES ON INNERMOST SIDE AND OUTERMOST SIDE IN TIRE WIDTH DIRECTION | ○ | ○ | ○ | ○ |
| RATIO OF VERTICAL LINE LENGTH CV TO CORE HEIGHT CH | 38% | 38% | 38% | 38% |
| RATIO OF DISTANCE Va FROM BEAD CORE BOTTOM SURFACE TO INNER END PORTION OF VERTICAL LINE TO CORE HEIGHT CH | 28% | 28% | 28% | 28% |
| IN ADJACENT LAYERS IN RADIAL DIRECTION FROM FIRST LAYER TO THIRD LAYER OF BEAD CORE, NUMBER OF WIRES ON OUTER SIDE IN RADIAL DIRECTION IS LARGER BY TWO OR MORE | ○ | ○ | ○ | ○ |
| FROM FIRST LAYER TO THIRD LAYER OF BEAD CORE, MISALIGNMENT BETWEEN BEAD WIRES AT EACH END PORTION ON ONE SIDE IS ONE-HALF OF THICKNESS OF BEAD WIRE | ○ | ○ | ○ | ○ |
| RATIO OF WIDTH CBW OF BEAD CORE BOTTOM SURFACE TO MAXIMUM WIDTH CW OF BEAD CORE | 58% | 58% | 58% | 58% |
| RATIO OF DISTANCE Vb BETWEEN VERTICAL LINE ON INNER SIDE AND BEAD CORE TOP SURFACE END PORTION TO MAXIMUM WIDTH CW OF BEAD CORE | 18% | 18% | 18% | 18% |
| RATIO OF DISTANCE Vc BETWEEN VERTICAL LINE ON INNER SIDE AND BEAD CORE BOTTOM SURFACE END PORTION TO MAXIMUM WIDTH CW OF BEAD CORE | 18% | 18% | 18% | 18% |
| RATIO OF MAXIMUM WIDTH CW OF BEAD CORE TO CORE HEIGHT CH | 1.4 TIMES | 1.2 TIMES | 1.2 TIMES | 1.2 TIMES |
| NUMBER OF ENDS (CORDS PER 50 mm) OF CARCASS CORDS AT POSITION ON INNER SIDE OF BEAD CORE IN TIRE WIDTH DIRECTION | 21 | 21 | 10 | 20 |
| BREAKAGE INDEX OF BEAD PORTION CARCASS WIRE | 153 | 155 | 160 | 162 |

FIG. 6F

PNEUMATIC TIRE

TECHNICAL FIELD

The present technology relates to a pneumatic tire.

BACKGROUND ART

A pneumatic tire is mounted on a rim wheel by fitting a bead portion, which includes a bead core that is an annular member formed by bundling a plurality of bead wires, onto a rim of the rim wheel. The bead portion, which is a portion that is actually mounted on the rim wheel in mounting the pneumatic tire on the rim wheel, is an important portion for ensuring the performance of the pneumatic tire, and some known pneumatic tires achieve their desired performance by making various types of modifications to the bead portion.

For example, in a pneumatic tire described in Japan Unexamined Patent Publication No. 2018-34784 A, a bead core includes a substantially flat bead surface bonded to rounded end portions on both sides, thereby reducing wear in a bead region. In a heavy duty pneumatic tire described in Japan Unexamined Patent Publication No. H09-240223 A, inner and outer contours of a bead core in a radial direction are formed by a lower bottom side and an upper bottom side that extend in a tire axial direction, an outer contour in a tire axial direction is formed by a pair of upper and lower outer oblique sides each extending at an incline from outer ends of the lower bottom side and the upper bottom side in the tire axial direction toward an outer side in the tire axial direction, and an inner contour in the tire axial direction of the bead core is formed by an inner side connecting inner ends of the lower bottom side and the upper bottom side in the tire axial direction, thus improving durability performance of a bead portion.

In a bead core described in Japan Unexamined Patent Publication No. 2005-88793 A, a cross-sectional shape on a radially inner side from a cross-sectional center of the bead core is formed by a bottom side parallel to an axial direction of the bead core, both left and right intermediate sides orthogonal to the axial direction of the bead core, and oblique sides composed of two sides meeting at an obtuse angle, connecting inner ends of the left and right intermediate sides to both sides of the bottom side, thereby reducing a breakage failure due to fretting of carcass cords and a tire failure due to an air pocket. In a pneumatic tire described in Japan Patent No. 4243091 B, in manufacturing a bead core having an annular shape as a whole and composed of wires arranged in a plurality of rows and a plurality of stages without a gap, a wire on the outermost side in a width direction of each wire row from the innermost circumferential side to the maximum width position is positioned on an outer side in the width direction with respect to each wire on the outermost side in the width direction of a wire row on the inner circumferential side of each wire row, and a misalignment amount thereof is reduced as a tendency from the innermost circumferential side toward the maximum width position, thus preventing breakage of a carcass and generation of corrugation to a turned-up end portion of the carcass in, for example, manufacturing of the tire.

Here, although a bead core typically has a polygonal shape in a tire meridian cross-section, some ultra-large pneumatic tires include a nylon cover wound around a bead core to avoid stress concentration on a carcass due to a corner of the bead core. However, a sufficient distance between the corner of the bead core and the carcass is not ensured only with the nylon cover, and thus a portion near the corner of the bead core and the carcass are likely to rub against each other while being subjected to large force when large tension acts on the carcass. In this case, the corner of the bead core and the carcass rub against each other, and thus the carcass cord may break. In particular, in a pneumatic tire mounted on a vehicle, such as a loader or a scraper for which traction performance is required, a bead core having a relatively flat shape in a tire meridian cross-section is often used, and a corner of the bead core and the carcass are likely to rub against each other, so the carcass cord is prone to breakage. Therefore, for the pneumatic tires of the related art, there is room for improvement in terms of the durability of the bead portion.

SUMMARY

The present technology has been made in view of the description above, and the present technology provides a pneumatic tire that can provide improved durability of a bead portion.

A pneumatic tire according to an embodiment of the present technology includes: a pair of bead portions disposed on both respective sides of a tire equatorial plane in a tire width direction; a bead core disposed in each of the pair of bead portions, formed by winding a bead wire into a ring shape, and having a polygonal cross-sectional shape in a tire meridian cross-section; and a carcass including a carcass body portion disposed extending between the pair of bead portions and a turned-up portion that is formed continuously from the carcass body portion and is folded back from an inner side in the tire width direction to an outer side in the tire width direction of the bead core, the carcass being formed by coating a carcass cord with a coating rubber. The bead core has a portion located on an innermost side in the tire width direction and a portion located on an outermost side in the tire width direction in a contour in the tire meridian cross-section each formed as a vertical line extending along a tire radial direction. The vertical line has a length within a range of 31% or more and 45% or less with respect to a core height that is a height of the bead core in the tire radial direction. The vertical line has a distance in the tire radial direction from a bead core bottom surface that is an inner circumferential surface of the bead core to an inner end portion in the tire radial direction of the vertical line within a range of 20% or more and 35% or less with respect to the core height. In the bead core, a plurality of circumferential portions of the bead wire wound in a ring shape are aligned in the tire width direction to form a layer, and a plurality of the layers are layered in the tire radial direction. For a first layer that is the layer located on an innermost circumference in the tire radial direction, a second layer that is the layer layered adjacent to an outer side of the first layer in the tire radial direction, and a third layer that is the layer layered adjacent to an outer side of the second layer in the tire radial direction of the plurality of the layers, in two of the layers adjacent to each other in the tire radial direction, the number of the bead wires in the layer located relatively on the outer side in the tire radial direction is larger by two or more than the number of the bead wires in the layer located on an inner side in the tire radial direction, and a misalignment amount in the tire width direction between the bead wires located at an end portion on one side in the tire width direction is one-half of the bead wire. A side on which the misalignment amount between the bead wires in the first layer and the second layer is one-half of the bead wire is opposite in the tire width direction to a side on which the misalignment amount between the bead wires in the second layer and the third layer is one-half of the bead wire.

In addition, in the pneumatic tire described above, the bead core preferably has a width of the bead core bottom surface in the tire meridian cross-section within a range of 45% or more and 70% or less with respect to a maximum width of the bead core.

In addition, in the pneumatic tire described above, the bead core preferably has a distance in the tire width direction between an end portion on an inner side in the tire width direction on a bead core top surface that is an outer circumferential surface in the tire meridian cross-section and the vertical line on the inner side in the tire width direction within a range of 10% or more and 25% or less with respect to a maximum width of the bead core, has a distance in the tire width direction between an end portion on the inner side in the tire width direction on the bead core bottom surface and the vertical line on the inner side in the tire width direction within a range of 10% or more and 25% or less with respect to the maximum width of the bead core, and has the maximum width of the bead core within a range of 0.9 times or more and 1.4 times or less as large as the core height.

In addition, in the pneumatic tire described above, the carcass preferably has the number of ends of the carcass cords at a position on the inner side in the tire width direction of the bead core within a range of 10 cords per 50 mm or more and 20 cords per 50 mm or less.

The pneumatic tire according to an embodiment of the present technology has an effect capable of providing improved durability of the bead portion.

BRIEF DESCRIPTION OF DRAWINGS

FIGS. 6A-6F are tables indicating results of performance evaluation tests of pneumatic tires.

DETAILED DESCRIPTION

Pneumatic tires according to embodiments of the present technology are described in detail below with reference to the drawings. However, the technology is not limited to the embodiments. In addition, constituents of the following embodiments include elements that can be substituted and easily conceived of by a person skilled in the art or that are substantially identical.

Embodiments

In the following description, the term "tire radial direction" refers to a direction orthogonal to the tire rotation axis (not illustrated) which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction. In addition, the term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane orthogonal to the tire rotation axis and running through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is a width in the tire width direction between portions located on the outermost sides in the tire width direction, in other words, a distance between the portions that are the most distant from the tire equatorial plane CL in the tire width direction. The term "tire equator line" refers to a line in the tire circumferential direction of the pneumatic tire 1 that lies on the tire equatorial plane CL. Further, in the description below, "tire meridian cross-section" refers to a cross-section of the tire taken along a plane including the tire rotation axis.

Figure 1:
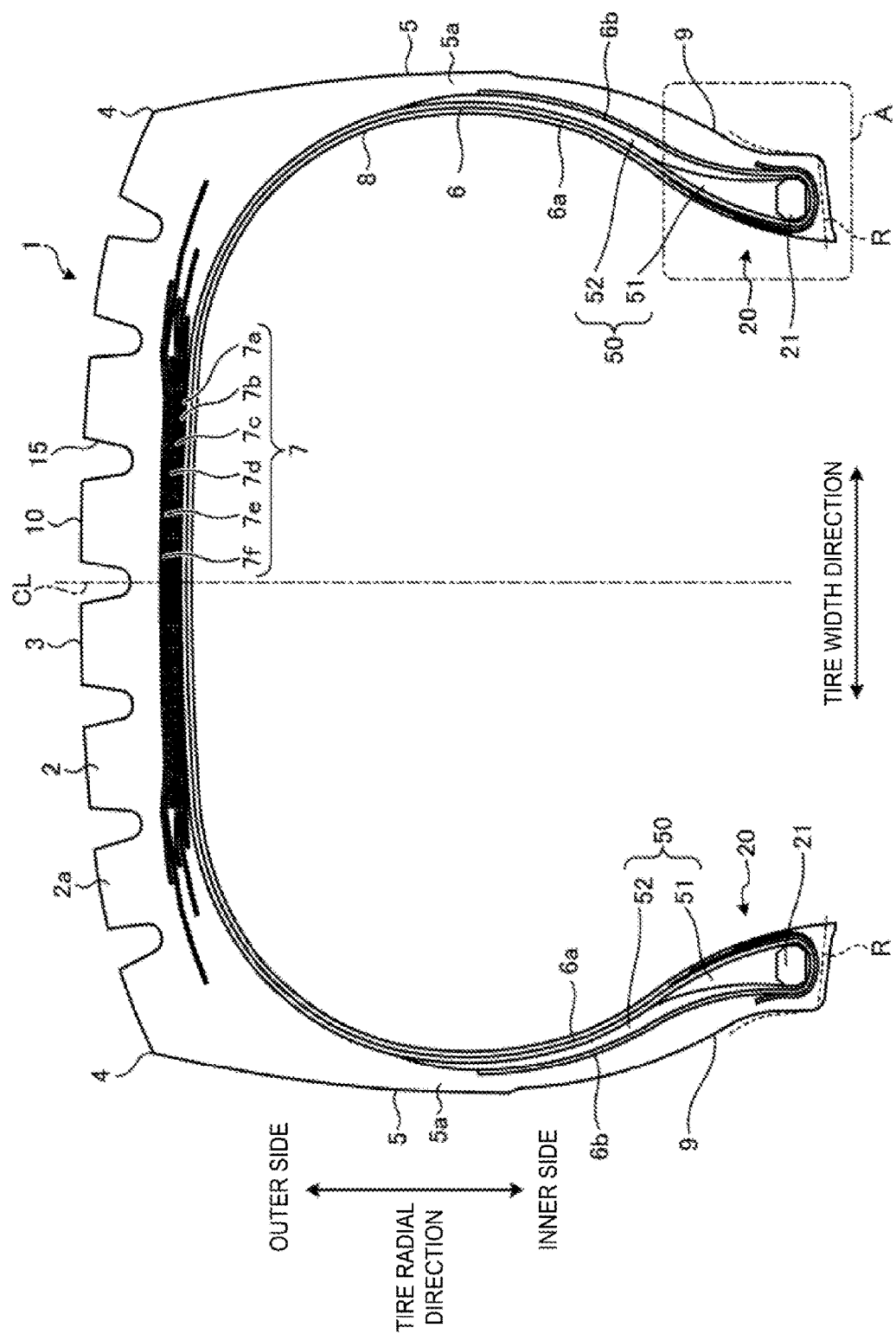
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. The pneumatic tire 1 according to the embodiment is a radial tire for a construction vehicle referred to as an off the road tire (OR tire). The pneumatic tire 1 illustrated in FIG. 1 as the present embodiment includes a tread portion 2 disposed on an outermost side in the tire radial direction as viewed in the tire meridian cross-section, and the tread portion 2 is composed of a tread rubber 2a that is a rubber composition. The surface of the tread portion 2, that is, a portion that comes into contact with a road surface during traveling of a vehicle (not illustrated) mounted with the pneumatic tire 1, is formed as a tread contact surface 3.

A plurality of grooves, such as circumferential grooves 15 extending in the tire circumferential direction and lug grooves extending in the tire width direction, (not illustrated) are formed in the tread contact surface 3 of the tread portion 2, and a plurality of land portions 10 are defined and formed in the tread portion 2 by the grooves.

Both ends of the tread portion 2 in the tire width direction are formed as shoulder portions 4. Sidewall portions 5 are disposed from the shoulder portions 4 to predetermined positions on an inner side in the tire radial direction. In other words, the sidewall portions 5 are disposed at two positions on both sides of the pneumatic tire 1 in the tire width direction. The sidewall portion 5 is composed of a sidewall rubber 5a, which is a rubber composition. Additionally, a rim check line 9 is formed at a position closer to the inner side in the tire radial direction in each of the sidewall portions 5 on both sides in the tire width direction. The rim check line 9 projects from a surface of the sidewall portion 5 and is formed all around the circumference in the tire circumferential direction.

Furthermore, a bead portion 20 is located on an inner side of each sidewall portion 5 in the tire radial direction, and similar to the sidewall portions 5, the bead portions 20 are disposed at two positions on both sides of the tire equatorial plane CL. In other words, a pair of the bead portions 20 are disposed on both sides of the tire equatorial plane CL in the tire width direction. A bead core 21 is disposed in each of the pair of bead portions 20, and a bead filler 50 is disposed on an outer side of each bead core 21 in the tire radial direction.

The bead core 21 is formed by winding a bead wire 30 (see FIG. 3), which is a steel wire, into a ring shape. The bead filler 50 is a rubber material disposed in a space formed by an end portion in the tire width direction of a carcass 6 described below being folded back to the outer side in the tire width direction at the position of the bead core 21. In addition, the bead filler 50 includes a lower filler 51 disposed in contact with an outer circumferential surface of the bead core 21, and an upper filler 52 disposed at a position closer to the outer side in the tire radial direction than the lower filler 51.

The bead portion 20 is configured to be mountable on a rim wheel including a 5°-tapered specified rim R. Specifically, the pneumatic tire 1 according to the present embodiment can be mounted on the specified rim R including a portion fitted to the bead portion 20 and inclined in a direction toward an outer side in the tire radial direction as the portion extends from an inner side toward an outer side in the tire width direction at an inclination angle of 5°±1° with respect to the rotation axis of the rim wheel. Note that "specified rim R" refers to an "applicable rim" defined by the JATMA (Japan Automobile Tyre Manufacturers Association, Inc.), a "Design Rim" defined by the TRA (Tire and Rim Association, Inc.), or a "Measuring Rim" defined by the ETRTO (European Tyre and Rim Technical Organisation).

A belt layer 7 is provided on an inner side of the tread portion 2 in the tire radial direction. The belt layer 7 has a multilayer structure in which three or more belt plies are layered, and in a typical OR tire, four to eight belt plies are layered. In the present embodiment, the belt layer 7 has six belt plies 7a, 7b, 7c, 7d, 7e, and 7f, layered. The belt plies 7a, 7b, 7c, 7d, 7e, and 7f constituting the belt layer 7 in this way are formed by coating a plurality of belt cords made from steel or an organic fiber material with coating rubber, followed by rolling processing. The six belt plies 7a, 7b, 7c, 7d, 7e, and 7f include, for example, cross belt layers 7a, 7b, 7c, and 7d and protective belt layers 7e and 7f. Additionally, the belt plies 7a, 7b, 7c, 7d, 7e, and 7f have mutually different inclination angles of the belt cords in the tire width direction with respect to the tire circumferential direction, are layered such that the inclination directions of the cross belt layers and protective belt layers intersect with one another in the layers, and are thus configured into a so-called crossply structure.

The carcass 6, which includes a code of a radial ply, is provided in a continuous manner on an inner side of the belt layer 7 in the tire radial direction and on the tire equatorial plane CL side of the sidewall portion 5. The carcass 6 has a single layer structure made of one carcass ply or a multilayer structure made of a plurality of layered carcass plies, and extends between the bead cores 21 disposed on both sides in the tire width direction in a toroidal shape, forming a backbone of the tire. Specifically, the carcass 6 extends between the pair of bead portions 20, and is disposed extending from one bead portion 20 to the other bead portion 20 of the pair of bead portions 20 located on both sides in the tire width direction. In addition, the carcass 6 is folded back from the inner side of the bead core 21 in the tire width direction to the outer side in the tire width direction in the bead portion 20 through the inner side of the bead core 21 in the tire radial direction while wrapping the bead core 21 and the bead filler 50. In other words, the carcass 6 is folded back around the bead core 21 from the inner side of the bead core 21 in the tire width direction to the outer side of the bead core 21 in the tire width direction in the bead portion 20.

Thus, the carcass 6 includes a carcass body portion 6a disposed between the pair of bead portions 20 and a turned-up portion 6b formed continuously from the carcass body portion 6a and folded back from the inner side in the tire width direction to the outer side in the tire width direction of the bead core 21. The carcass body portion 6a referred to herein is a portion formed between the inner sides of the pair of bead cores 21 in the tire width direction in the carcass 6, and the turned-up portion 6b is a portion formed continuously from the carcass body portion 6a on the inner side of the bead core 21 in the tire width direction, running through the inner side of the bead core 21 in the tire radial direction, and folded back to the outer side in the tire width direction. The bead filler 50 is disposed on the inner side of the turned-up portion 6b in the tire width direction, which is a portion folded back to the outer side of the bead core 21 in the tire width direction in this manner, and on the outer side of the bead core 21 in the tire radial direction.

The carcass ply of the carcass 6 disposed in this manner is formed by coating a plurality of carcass cords 6c (see FIG. 2) as cord members made of steel or an organic fiber material, such as aramid, nylon, polyester, or rayon, with a coating rubber 6d (see FIG. 2), which is a rubber member, followed by rolling processing. Additionally, the carcass 6 has a carcass angle of 85° or more and 95° or less, the carcass angle being the inclination angle of the carcass cords 6c with respect to the tire circumferential direction.

Additionally, an innerliner 8 is formed along the carcass 6 on the inner side of the carcass 6 or on the inner side of the carcass 6 in the pneumatic tire 1.

Figure 2:
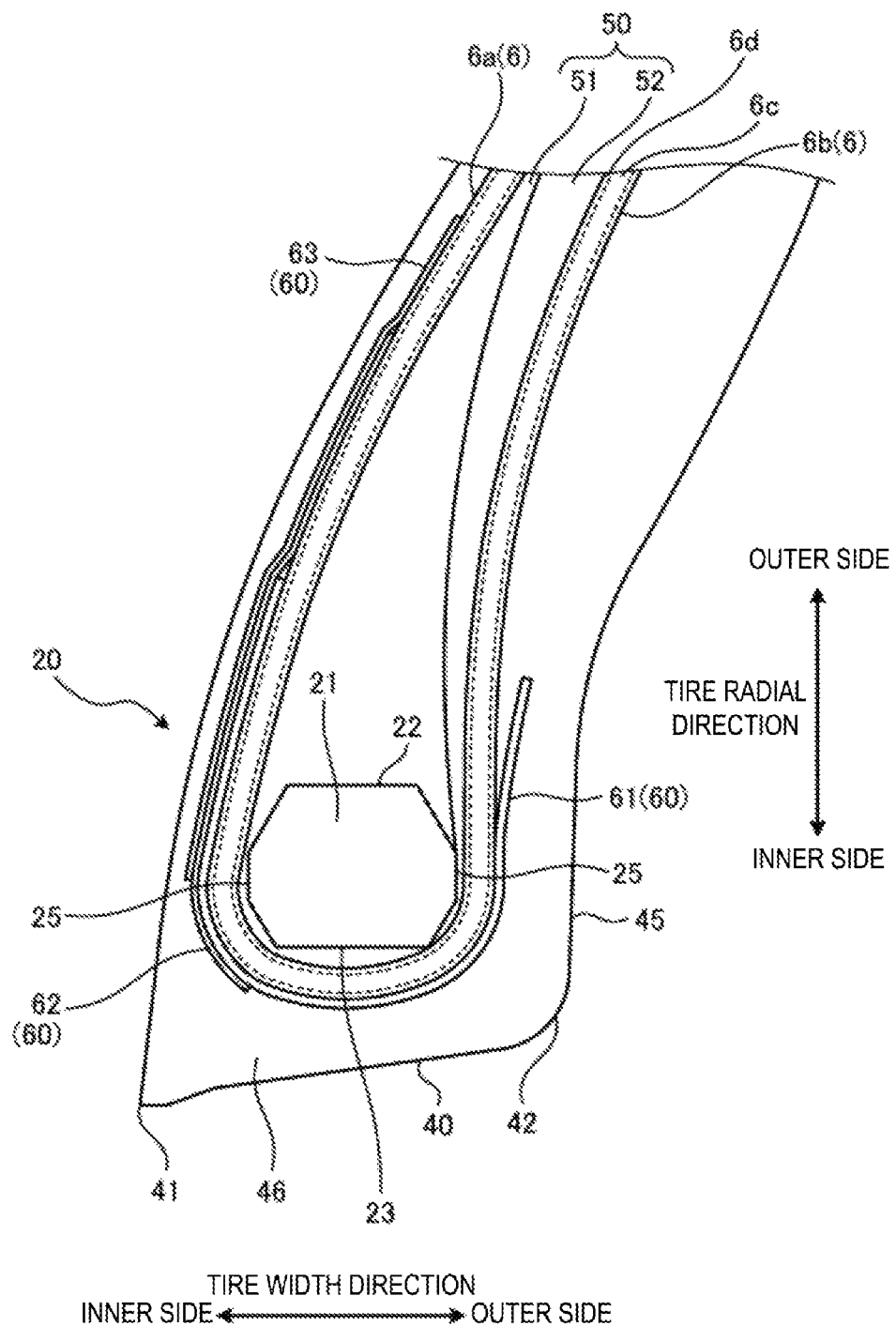
FIG. 2 is a detailed view of portion A in FIG. 1.
Figure 3:
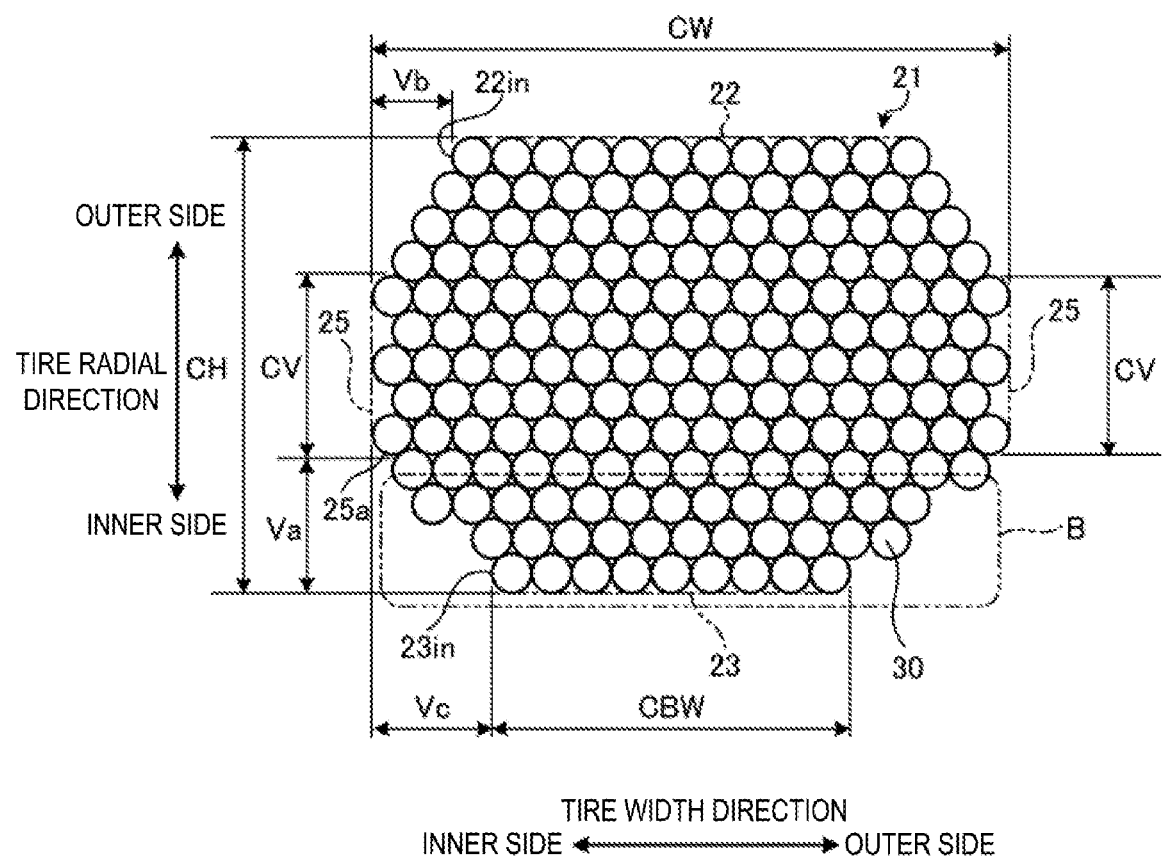
FIG. 3 is a detailed view of a bead core illustrated in FIG. 2.

FIG. 2 is a detailed view of portion A in FIG. 1. FIG. 3 is a detailed view of the bead core 21 illustrated in FIG. 2. The bead core 21 is formed to have a polygonal cross-sectional shape when viewed in the tire meridian cross-section. In the present embodiment, the bead core 21 is formed to have a cross-sectional shape close to an octagon. Specifically, the bead core 21 is formed such that a bead core bottom surface 23 corresponding to an inner circumferential surface of the bead core 21 and a bead core top surface 22 corresponding to the outer circumferential surface of the bead core 21 in the overall view of the bead core 21 are substantially parallel to each other. In addition, the bead core 21 has a portion located on the innermost side in the tire width direction and a portion located on the outermost side in the tire width direction in a contour in the tire meridian cross-section each formed as a vertical line 25 extending along the tire radial direction.

In addition, in the contour of the bead core 21 in the tire meridian cross-section, an inner portion in the tire radial direction of the vertical line 25 on the inner side in the tire width direction and an end portion on the inner side in the tire width direction of the bead core bottom surface 23 are connected in a side shape, and an outer portion in the tire radial direction of the vertical line 25 on the inner side in the tire width direction and an end portion on the inner side in the tire width direction of the bead core top surface 22 are connected in a side shape. Also, in the contour of the bead core 21 in the tire meridian cross-section, an inner portion in the tire radial direction of the vertical line 25 on the outer side in the tire width direction and an end portion on the outer side in the tire width direction of the bead core bottom surface 23 are connected in a side shape, and an outer portion in the tire radial direction of the vertical line 25 on the outer side in the tire width direction and an end portion on the outer side in the tire width direction of the bead core top surface 22 are connected in a side shape. This forms the bead core 21 in a substantially octagonal shape in the tire meridian cross-section.

Note that, the bead core bottom surface 23 of the bead core 21 in this case refers to, in the tire meridian cross-section, a surface indicated by an imaginary straight line in contact with a portion, which is exposed on the surface side of the bead core 21, of a plurality of the bead wires 30 aligned in a row at a position on the inner side of the bead core 21 in the tire radial direction to form the surface of the bead core 21. Similarly, the bead core top surface 22 of the bead core 21 refers to, when the pneumatic tire 1 is viewed in the tire meridian cross-section, a surface indicated by an imaginary straight line in contact with a portion, which is exposed on the surface side of the bead core 21, of a plurality of the bead wires 30 disposed in a row at a position on the outer side of the bead core 21 in the tire radial direction to form the surface of the bead core 21.

In addition, the vertical line 25 of the bead core 21 refers to, when the tire width direction is the width direction of the bead core 21 in the tire meridian cross-section, an imaginary straight line in contact with a portion, which is exposed on the outer side of the bead core 21 in the width direction, of a plurality of the bead wires 30 located on the outermost side of the bead core 21 in the width direction. Specifically, the vertical line 25 is formed to extend along the tire radial direction in a state where a spacing in the tire width direction between the pair of bead portions 20 located on the both sides in the tire width direction with respect to the tire equatorial plane CL is a spacing when the pneumatic tire 1 is mounted on the specified rim R (see FIG. 1).

In other words, the bead wires 30 are disposed in the bead core 21 such that an imaginary straight line in contact with the plurality of bead wires 30 located on the outermost side in the width direction of the bead core 21 extends along the tire radial direction in a state where a spacing in the tire width direction between the pair of bead portions 20 located on the both sides in the tire width direction with respect to the tire equatorial plane CL is a spacing when the pneumatic tire 1 is mounted on the specified rim R.

In the present embodiment, the vertical line 25 on the inner side of the bead core 21 in the tire width direction in the tire meridian cross-section is located on the innermost side of the bead wires 30 in the tire width direction and is a tangent line in contact with the bead wires 30 at three positions aligned with spacing in the tire radial direction. In addition, the vertical line 25 on the outer side of the bead core 21 in the tire width direction in the tire meridian cross-section is located on the outermost side of the bead wires 30 in the tire width direction and is a tangent line in contact with the bead wires 30 at three positions aligned with spacing in the tire radial direction.

Note that, the shape around the bead portion 20 is hereinafter described in the same manner as the description of the vertical line 25, and a spacing in the tire width direction of the pair of bead portions 20 located on the both sides in the tire width direction with respect to the tire equatorial plane CL is a spacing when the pneumatic tire 1 is mounted on the specified rim R. In addition, the vertical line 25 of the bead core 21 need not strictly extend in the tire radial direction. The vertical line 25 may be formed within a range of 0° or more and 15° or less with respect to the tire radial direction.

As described above, the vertical line 25 located on each of both sides in the width direction of the bead core 21 has a length CV within a range of 31% or more and 45% or less with respect to a core height CH that is a height in the tire radial direction of the bead core 21. In other words, the vertical line 25 has a ratio CV/CH of the length CV to the core height CH within the range of 31% or more and 45% or less. The length CV of the vertical line 25 in this case is a distance between an end portion on the outer side in the tire radial direction of the bead wire 30 located on the outermost side in the tire radial direction and an end portion on the inner side in the tire radial direction of the bead wire 30 located on the innermost side in the tire radial direction among the plurality of bead wires 30 constituting the vertical line 25. In addition, the core height CH in this case is a distance between the bead core top surface 22 and the bead core bottom surface 23.

Further, the vertical line 25 has a distance Va in the tire radial direction from the bead core bottom surface 23 to an inner end portion 25a in the tire radial direction of the vertical line 25 within a range of 20% or more and 35% or less of the core height CH. In this case, the inner end portion 25a of the vertical line 25 in the tire radial direction is an end portion on the inner side in the tire radial direction of the bead wire 30 located on the innermost side in the tire radial direction among the plurality of bead wires 30 constituting the vertical line 25.

Specifically, the bead core 21 has the vertical lines 25 on the both sides in the width direction of the bead core 21, and each of the vertical lines 25 located on the both sides in the width direction of the bead core 21 has the distance Va in the tire radial direction from the bead core bottom surface 23 to the inner end portion 25a in the tire radial direction of the vertical line 25 within the range of 20% or more and 35% or less of the core height CH. In other words, any of the vertical lines 25 located on the both sides in the width direction of the bead core 21 has a ratio Va/CH of the distance Va in the tire radial direction from the bead core bottom surface 23 to the inner end portion 25a of the vertical line 25 to the core height CH within the range of 20% or more and 35% or less.

In addition, the bead core 21 has, in the tire meridian cross-section, a distance Vb in the tire width direction between an end portion 22 in on the inner side in the tire width direction of the bead core top surface 22 and the vertical line 25 on the inner side in the tire width direction of the vertical lines 25 on the both sides of the bead core 21 in the tire width direction within a range of 10% or more and 25% or less with respect to a maximum width CW of the bead core 21. In other words, the bead core 21 has a ratio Vb/CW of the distance Vb in the tire width direction between the end portion 22 in on the inner side in the tire width direction of the bead core top surface 22 and the vertical line 25 on the inner side in the tire width direction to the maximum width CW of the bead core 21 within the range of 10% or more and 25% or less. The maximum width CW of the bead core 21 in this case is a distance between the vertical lines 25 located on the both sides in the width direction of the bead core 21. In addition, the end portion 22 in on the inner side in the tire width direction of the bead core top surface 22 in this case is an end portion on the inner side in the tire width direction of the bead wire 30 located on the innermost side in the tire width direction among the plurality of bead wires 30 constituting the bead core top surface 22.

Similarly, the bead core 21 has a distance Vc in the tire width direction between an end portion 23 in on the inner side in the tire width direction of the bead core bottom surface 23 and the vertical line 25 on the inner side in the tire width direction within a range of 10% or more and 25% or less with respect to the maximum width CW of the bead core 21. In other words, the bead core 21 has a ratio Vc/CW of the distance Vc in the tire width direction between the end portion 23 in on the inner side in the tire width direction of the bead core bottom surface 23 and the vertical line 25 on the inner side in the tire width direction to the maximum width CW of the bead core 21 within the range of 10% or more and 25% or less. The end portion 23 in on the inner side in the tire width direction of the bead core bottom surface 23 in this case is an end portion on the inner side in the tire width direction of the bead wire 30 located on the innermost side in the tire width direction among the plurality of bead wires 30 constituting the bead core bottom surface 23.

Additionally, the bead core 21 has, in the tire meridian cross-section, the maximum width CW of the bead core 21 within a range of 0.9 times or more and 1.4 times or less as large as the core height CH. Moreover, the bead core 21 has a width CBW of the bead core bottom surface 23 in the tire meridian cross-section within a range of 45% or more and 70% or less with respect to the maximum width CW of the bead core 21. In other words, the bead core 21 has a ratio CW/CH of the maximum width CW of the bead core 21 to the core height CH within the range of 0.9 times or more and 1.4 times or less and a ratio CBW/CW of the width CBW of the bead core bottom surface 23 to the maximum width CW of the bead core 21 within the range of 45% or more and 70% or less.

Figure 4:
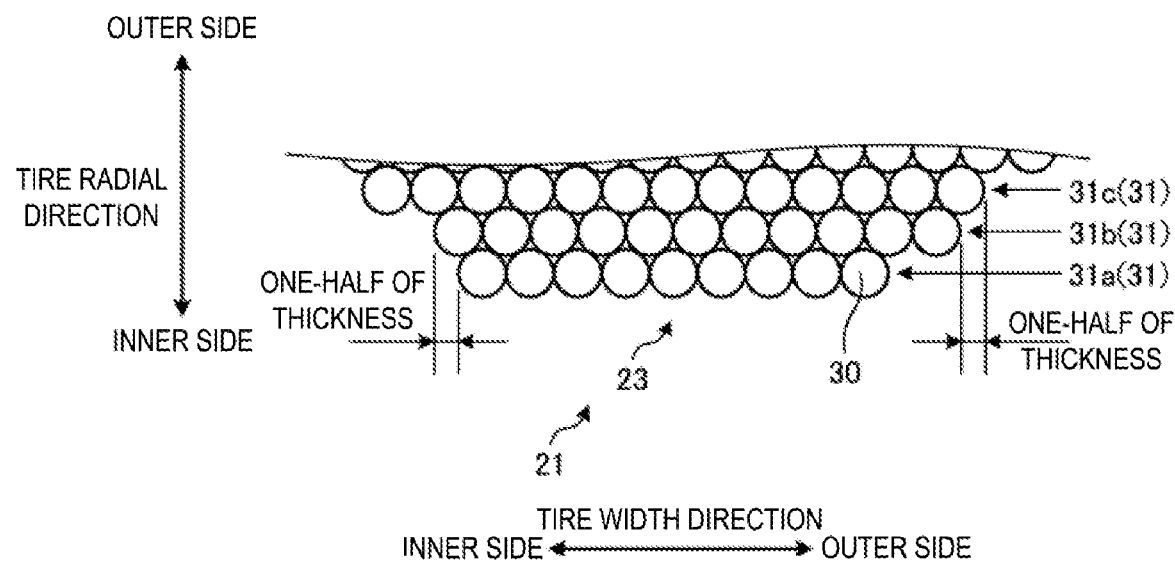
FIG. 4 is a detailed view of portion B in FIG. 3.

FIG. 4 is a detailed view of portion B in FIG. 3. The bead core 21 is formed by winding the bead wire 30 in a ring shape. Specifically, a plurality of circumferential portions of the bead wire 30 wound in a ring shape are aligned in the tire width direction to form one layer 31, and a plurality of the layers 31 are layered in the tire radial direction. In this case, in the layers 31 adjacent to each other in the tire radial direction, the bead wires 30 forming the respective layers 31 are disposed misaligned in the tire width direction by one-half of a thickness of the bead wire 30.

For a first layer 31a, a second layer 31b, and a third layer 31c counted from the inner side in the tire radial direction of the plurality of layers 31 included in the bead core 21, in two of the layers 31 adjacent to each other in the tire radial direction, the number of bead wires 30 in the layer 31 located relatively on the outer side in the tire radial direction is larger by two or more than the number of bead wires 30 in the layer 31 located on the inner side in the tire radial direction. The first layer 31a in this case is the layer 31 located on the innermost circumference in the tire radial direction among the plurality of layers 31 included in the bead core 21. In addition, the second layer 31b is the layer 31 layered adjacent to the outer side of the first layer 31a in the tire radial direction, and the third layer 31c is the layer 31 layered adjacent to the outer side of the second layer 31b in the tire radial direction. In the present embodiment, the number of bead wires 30 in the second layer 31b is larger by two than that in the first layer 31a, and the number of bead wires 30 in the third layer 31c is larger by two than that in the second layer 31b.

In addition, for the first layer 31a, the second layer 31b, and the third layer 31c of the bead core 21, in two of the layers 31 adjacent to each other in the tire radial direction, a misalignment amount in the tire width direction of the bead wires 30 each located at an end portion on one side in the tire width direction is one-half of the thickness of the bead wire 30. Further, in the first layer 31a, the second layer 31b, and the third layer 31c, a side on which the misalignment amount between the bead wires 30 located in the end portions in the tire width direction of the first layer 31a and the second layer 31b is one-half of the bead wire 30 is located opposite in the tire width direction to a side on which the misalignment amount between the bead wires 30 located in the end portions in the tire width direction of the second layer 31b and the third layer 31c is one-half of the bead wire 30.

Specifically, in the first layer 31a and the second layer 31b, the misalignment amount in the tire width direction between the bead wires 30 located in the end portions on the inner side in the tire width direction is one-half of the thickness of the bead wire 30. In contrast, in the second layer 31b and the third layer 31c, the misalignment amount in the tire width direction between the bead wires 30 located in the end portions on the outer side in the tire width direction is one-half of the thickness of the bead wire 30.

In addition, in the present embodiment, the bead core 21 is configured such that the number of the bead wires 30 in the layer 31 decreases by one toward the outer side in the tire radial direction on the further outer side in the tire radial direction than the layer 31 including the bead wires 30 forming the end portion on the outer side in the tire radial direction of the vertical line 25 (see FIG. 3) located on both sides in the width direction of the bead core 21 in the plurality of layers 31 layered in the tire radial direction.

The carcass 6 is disposed by being folded back around the bead core 21 from the inner side in the tire width direction to the outer side in the tire width direction of the bead core 21 formed as described above, and is configured by covering the plurality of carcass cords 6c with the coating rubber 6d, followed by rolling processing. In the carcass 6 including the plurality of carcass cords 6c, the number of ends of the carcass cords 6c at a position on an inner side of the bead core 21 in the tire width direction is within a range of 10 cords per 50 mm or more and 20 cords per 50 mm or less. In this case, the position on the inner side of the bead core 21 in the tire width direction is a position where the range in the tire radial direction at the position on the inner side in the tire width direction with respect to the bead core 21 is the same range as the range in the tire radial direction in which the bead core 21 is disposed. That is, the position on the inner side of the bead core 21 in the tire width direction in this case is a position within the same range as the range in the tire radial direction in which the bead core 21 is disposed in the carcass body portion 6a.

In the carcass 6, the number of ends per 50 mm in the direction, in which the carcass cords 6c are aligned, at the position on the inner side of the bead core 21 in the tire width direction defined as described above, that is, the cord count of the carcass cords 6c is within a range of 10 cords per 50 mm or more and 20 cords per 50 mm or less.

The bead filler 50 including the lower filler 51 and the upper filler 52 is disposed on the outer side of the bead core 21 in the tire radial direction. Of these fillers, the lower filler 51 is disposed between the carcass body portion 6a and the turned-up portion 6b included in the carcass 6. In addition, a width in the tire width direction of the lower filler 51 is approximately the same as that of the bead core 21 in a location near the bead core 21 in the tire meridian cross-section, and the width decreases toward the outer side in the tire radial direction.

On the other hand, the upper filler 52 is disposed from the position where the lower filler 51 is disposed in the tire radial direction to the position on the outer side of the lower filler 51 in the tire radial direction, and an inner end portion of the upper filler 52 in the tire radial direction is located near the bead core 21. Specifically, within a range in which the lower filler 51 is disposed in the tire radial direction, the upper filler 52 is located on the outer side of the lower filler 51 in the tire width direction and disposed between the turned-up portion 6b of the carcass 6 and the lower filler 51, and on the outer side of the lower filler 51 in the tire radial direction, the upper filler 52 is disposed between the carcass body portion 6a and the turned-up portion 6b of the carcass 6 (see FIG. 1).

The lower filler 51 and the upper filler 52 included in the bead filler 50 are rubber compositions having physical properties different from each other.

In addition, the bead portion 20 includes a rim cushion rubber 46 on the inner side of the bead core 21 in the tire radial direction. The rim cushion rubber 46 also forms a bead base portion 40 that is the inner circumferential surface of the bead portion 20 and is a rubber composition that is brought into contact with the rim wheel while being elastically deformed when fitted to the rim wheel.

The bead base portion 40 referred to herein is an inner circumferential surface of the bead portion 20, and is a portion of the bead portion 20, which is brought into contact with the rim wheel and fitted to the rim wheel. The bead base portion 40 includes a bead toe 41 at an inner end in the tire width direction and a bead heel 42 at an outer end in the tire width direction and is formed in a tapered shape in which a diameter increases from the bead toe 41 side toward the bead heel 42 side.

In the bead portion 20, a reinforcing layer 60 reinforcing the carcass 6 is disposed in a portion of the carcass 6 folded back around the bead core 21. The reinforcing layer 60 is disposed along the carcass 6 at least on the inner side of the carcass body portion 6a in the tire width direction. In the present embodiment, three reinforcing layers 60 are disposed, and these three reinforcing layers 60 are disposed such that positions of end portions in the tire radial direction in the tire meridian cross-section are different from each other.

Specifically, in the case where the three reinforcing layers 60 are referred to as a first reinforcing layer 61, a second reinforcing layer 62, and a third reinforcing layer 63 from the carcass 6 side toward the direction away from the carcass 6 in the thickness direction of the carcass 6 or the reinforcing layer 60, the first reinforcing layer 61 is disposed folded back along the carcass 6 from the inner side in the tire width direction to the outer side in the tire width direction of the bead core 21. In contrast, the second reinforcing layer 62 and the third reinforcing layer 63 are not disposed on the outer side of the bead core 21 in the tire width direction. In other words, the second reinforcing layer 62 and the third reinforcing layer 63 are not disposed on the turned-up portion 6b side but are disposed along the carcass 6 only within a range where the carcass body portion 6a is located.

In the second reinforcing layer 62 and the third reinforcing layer 63 disposed as described above, the end portion on the inner side in the tire radial direction in the tire meridian cross-section is located on the further inner side in the tire radial direction in the second reinforcing layer 62 than in the third reinforcing layer 63. In addition, in the second reinforcing layer 62 and the third reinforcing layer 63, the end portion on the outer side in the tire radial direction in the tire meridian cross-section is located on the further outer side in the tire radial direction in the third reinforcing layer 63 than in the second reinforcing layer 62.

The plurality of reinforcing layers 60 disposed as described above are each configured by coating a plurality of cords with a coating rubber, followed by rolling processing. Of these reinforcing layers 60, in the first reinforcing layer 61, the cords are made of steel cords. On the other hand, in the second reinforcing layer 62, the cords are made of organic fiber cords. Similarly, in the third reinforcing layer 63, cords are made of organic fiber cords.

The first reinforcing layer 61 is disposed folded back along the carcass 6 from the inner side in the tire width direction to the outer side in the tire width direction of the bead core 21. In addition, the first reinforcing layer 61 has an end portion located on the inner side of the bead core 21 in the tire width direction and an end portion located on the outer side of the bead core 21 in the tire width direction in the first reinforcing layer 61, both the end portions being located on the further outer side in the tire radial direction than the bead core top surface 22 of the bead core 21.

In addition, in the plurality of reinforcing layers 60 disposed by being overlapped along the carcass 6 in the bead portion 20, the reinforcing layers 60 adjacent to each other have the inclination directions of the cords of the respective reinforcing layers 60 in the tire circumferential direction with respect to the tire radial direction opposite to each other.

Method of Manufacturing Pneumatic Tire

Next, a method of manufacturing the pneumatic tire 1 according to the embodiment will be described. In manufacturing the pneumatic tire 1, first, processing is performed on each of the members constituting the pneumatic tire 1, and the processed members are assembled. In other words, the rubber members such as the tread rubber 2a and each of the members such as the carcass 6, the belt layer 7, and the bead core 21 are processed, and the processed members are assembled.

For example, the bead core 21 is formed by winding the bead wire 30 into a ring shape. At this time, the bead core 21 is formed such that a portion located on the innermost side in the tire width direction and a portion located on the outermost side in the tire width direction in the contour in the tire meridian cross-section form the vertical lines 25 each extending along the tire radial direction. Further, the bead core 21 is made to have the length CV of the vertical line 25 within a range of 31% or more and 45% or less with respect to the core height CH of the bead core 21, and the vertical line 25 is made to have the distance Va in the tire radial direction from the bead core bottom surface 23 to the inner end portion 25a in the tire radial direction of the vertical line 25 within a range of 20% or more and 35% or less with respect to the core height CH.

In addition, the bead core 21 is formed by aligning a plurality of circumferential portions of the bead wire 30 in the tire width direction to form one layer 31 and layering a plurality of the layers 31 in the tire radial direction. At this time, for the three layers 31 of the first layer 31a, the second layer 31b, and the third layer 31c counted from the innermost circumference of the bead core 21 in the tire radial direction, in two of the layers 31 adjacent to each other in the tire radial direction, the number of bead wires 30 in the layer 31 located relatively on the outer side in the tire radial direction is made larger by two or more than the number of bead wires 30 in the layer 31 located on the inner side in the tire radial direction, and the misalignment amount in the tire width direction between the bead wires 30 each located at the end portion on one side in the tire width direction is made to be one-half of the thickness of the bead wire 30. In addition, in the three layers 31, the side on which the misalignment amount between the bead wires 30 in the first layer 31a and the second layer 31b is made to be one-half of the thickness of the bead wire 30 is made opposite in the tire width direction to the side on which the misalignment amount between the bead wires 30 in the second layer 31*b* and the third layer 31*c* is made to be one-half of the thickness of the bead wire 30.

In this manner, the bead wire 30 to be wound into a ring shape when forming the bead core 21 starts to be wound from the end portion on the outer side in the tire width direction of the first layer 31*a* when manufacturing the pneumatic tire 1. In other words, when the bead wire 30 is wound into a ring shape to form the bead core 21, the bead wire 30 is wound such that the end portion of the bead wire 30 located on the bead core bottom surface 23 is located at the end portion on the outer side in the tire width direction of the bead core bottom surface 23.

The bead wire 30 starting to be wound from the end portion on the outer side in the tire width direction of the bead core bottom surface 23 is spirally wound by a predetermined number of turns determined for each layer 31 to be aligned in the tire width direction, thereby forming the layer 31. When the number of times of winding the bead wire 30 reaches a predetermined number of turns determined for each layer 31, the bead wire 30 is folded back to the upper side in the tire radial direction and spirally wound by the number of turns determined as the number of turns of the layer 31 adjacent on the outer side in the tire radial direction, thereby forming the layer 31.

In other words, the bead wire 30 starts to be wound from the end portion on the outer side in the tire width direction in the first layer 31*a*, and when winding of the first layer 31*a* is completed, the second layer 31*b* adjacent to the first layer 31*a* on the outer side in the tire radial direction starts to be wound. As a result, the side on which the misalignment amount between the bead wires 30 in the first layer 31*a* and the second layer 31*b* is made to be one-half of the thickness of the bead wire 30 is inevitably located on the end portion side on the inner side in the tire width direction in the first layer 31*a* and the second layer 31*b*. By repeating such winding, the layers 31 formed by aligning a plurality of circumferential portions of the bead wire 30 in the tire width direction are layered in the tire radial direction, and thus the bead core 21 is formed to have a polygonal cross-sectional shape in the tire meridian cross-section.

In the bead portion 20 in which the bead core 21 formed in this manner is disposed, the carcass 6 is disposed folded back from the inner side in the tire width direction to the outer side in the tire width direction of the bead core 21. For the carcass 6, a carcass ply is used in which the number of ends of the carcass cords 6*c* at a position on the inner side of the bead core 21 in the tire width direction is within a range of 10 cords per 50 mm or more and 20 cords per 50 mm or less. The manufacturing of the pneumatic tire 1 is performed in this manner, and thus the pneumatic tire 1 according to the present embodiment is manufactured.

Functions and Effects

When mounting the pneumatic tire 1 according to the present embodiment on a vehicle, the bead base portion 40 is first fitted to the specified rim R of the rim wheel to mount the pneumatic tire 1 on the specified rim R, and the pneumatic tire 1 is mounted on the rim wheel. Once mounted on the rim, the pneumatic tire 1 is inflated, and the pneumatic tire 1 inflated is mounted on the vehicle. The pneumatic tire 1 according to the present embodiment is mounted on a vehicle, such as a loader and a scraper for which traction performance is required, for example, and is used under a large load condition.

When the vehicle on which the pneumatic tires 1 are mounted travels, the pneumatic tire 1 rotates while the tread contact surface 3 located at the lower side in the tread contact surface 3 comes into contact with the road surface. The vehicle travels by transferring a driving force or a braking force to the road surface, using the friction force between the tread contact surface 3 and the road surface, or by generating a turning force.

During traveling of the vehicle having the pneumatic tires 1 mounted thereon, although the vehicle can travel with the aid of a friction force generated between the tread contact surface 3 of the pneumatic tire 1 and the road surface in this way, loads in various directions act on each portion of the pneumatic tire 1 during traveling of the vehicle. The load acting on the pneumatic tire 1 is received by the pressure of the air filled inside the pneumatic tire 1, the carcass 6 provided as the framework of the pneumatic tire 1, and the like.

For example, due to the weight of the vehicle and the recesses and protrusions of the road surface, the load acting in the tire radial direction between the tread portion 2 and the bead portion 20 is mainly received by the pressure of the air filled inside the pneumatic tire 1 or deflection of the sidewall portion 5 or the like. In particular, since the pneumatic tire 1 according to the present embodiment is mounted on a large vehicle and used under a large load condition, the sidewall portions 5 and the carcass 6 receive a very large load. Therefore, a large tension acts on the carcass 6.

The carcass 6 is folded back around the bead core 21 in the bead portion 20 and thus held by the bead portion 20. Therefore, when a large tension acts on the carcass 6, the tension of the carcass 6 is transmitted to the bead core 21, and a large force acts between the carcass 6 and the bead core 21. In other words, since the carcass 6 is folded back around the bead core 21 and thus held by the bead portion 20, when the tension acts on the carcass 6, a tension in a direction from the bead portion 20 side toward the outer side in the tire radial direction acts on the carcass body portion 6*a*. Therefore, a large force also acts between the bead core 21 and the carcass 6 as well.

Here, the sidewall portion 5 is inclined with respect to the tire radial direction in a direction from the position of the bead portion 20 toward the outer side in the tire width direction as it is directed toward the outer side in the tire radial direction. Therefore, when a large tension acts on the carcass body portion 6*a*, while the carcass body portion 6*a* is pulled in the tire radial direction, the carcass body portion 6*a* generates a force in a direction toward the outer side in the tire width direction in the vicinity of the bead portion 20.

On the other hand, in a pneumatic tire mounted on a large vehicle and used under a large load condition, a bead core formed to have a substantially hexagonal cross-sectional shape in a tire meridian cross-section is often used, and in this case, the bead core has a corner portion projecting toward the inner side in the tire width direction. Accordingly, when a large tension acts on a carcass and a carcass body portion is about to move in the tire radial direction due to the tension while generating a force toward the outer side in the tire width direction at a location near a bead portion, the carcass body portion rubs against the corner portion projecting toward the inner side in the tire width direction in the bead core while applying a large load to the corner portion. This causes, in the carcass body portion, the coating rubber to be worn and the carcass cord to be directly rubbed, and a failure such as breakage of the carcass cord may occur.

In addition, the carcass is folded back around the bead core, and thus, when a large tension acts on the carcass, rubbing occurs between the carcass and the bead core even at a position other than the corner portion projecting toward the inner side in the tire width direction in the bead core, and a failure such as breakage of the carcass cord may occur in the carcass due to such rubbing.

In contrast, in the pneumatic tire 1 according to the present embodiment, the bead core 21 has a portion located on the innermost side in the tire width direction and a portion located on the outermost side in the tire width direction in the contour in the tire meridian cross-section each formed as the vertical line 25 extending along the tire radial direction. In other words, since the bead core 21 is formed in a shape forming the vertical line 25 extending along the tire radial direction at a position of the maximum width of the bead core 21 in the tire width direction, the bead core 21 is formed without a corner portion projecting with respect to the tire width direction. This allows, even when a large force acts between the carcass 6 and the bead core 21 due to the large tension acting on the carcass 6, the occurrence of stress concentration to be reduced and the stress acting between the carcass 6 and the bead core 21 to be dispersed. Accordingly, the wear of the coating rubber 6*d* of the carcass body portion 6*a* due to the stress concentration occurring between the carcass 6 and the bead core 21 can be suppressed, and the occurrence of a failure such as breakage of the carcass cord 6*c* due to direct rubbing of the carcass cord 6*c* caused by the wear of the coating rubber 6*d* can be reduced.

In addition, the length CV of the vertical lines 25 located on the both sides of the bead core 21 in the tire width direction is within the range of 31% or more and 45% or less with respect to the core height CH, and thus the stress generated between the carcass 6 and the bead core 21 can be more reliably dispersed. In other words, when the length CV of the vertical line 25 is less than 31% with respect to the core height CH, the length CV of the vertical line 25 is too short, and thus even forming the vertical lines 25 on the both sides of the bead core 21 in the tire width direction may make it difficult to effectively reduce the stress concentration occurring between the carcass 6 and the bead core 21. In addition, when the length CV of the vertical line 25 is larger than 45% with respect to the core height CH, the length CV of the vertical line 25 is too long, and thus even forming the vertical lines 25 on the both sides of the bead core 21 in the tire width direction may cause stress concentration to occur between the carcass 6 and the bead core 21 at both end positions in the length direction of the vertical line 25.

In contrast, when the length CV of the vertical line 25 is within the range of 31% or more and 45% or less with respect to the core height CH, the stress generated between the carcass 6 and the bead core 21 can be more reliably dispersed by the vertical lines 25 formed on the both sides of the bead core 21 in the tire width direction. This can more reliably reduce the occurrence of a failure such as breakage of the carcass cord 6*c* due to the stress concentration occurring between the carcass 6 and the bead core 21.

In addition, the vertical line 25 of the bead core 21 has the distance Va in the tire radial direction from the bead core bottom surface 23 to the inner end portion 25*a* in the tire radial direction of the vertical line 25 within the range of 20% or more and 35% or less with respect to the core height CH, allowing the occurrence of stress concentration generated between the carcass 6 and the bead core 21 to be more reliably reduced. In other words, when the distance Va in the tire radial direction from the bead core bottom surface 23 to the inner end portion 25*a* in the tire radial direction of the vertical line 25 is less than 20% with respect to the core height CH, the position of the vertical line 25 may be too close to the inner side in the tire radial direction.

In addition, when the distance Va in the tire radial direction from the bead core bottom surface 23 to the inner end portion 25*a* in the tire radial direction of the vertical line 25 is larger than 35% with respect to the core height CH, the position of the vertical line 25 may be too close to the outer side in the tire radial direction. In these cases, the shape of the bead core 21 in which the vertical lines 25 are formed on the both sides in the tire width direction may be unlikely to be a shape along the shape of the carcass 6 folded back at the bead portion 20. This causes stress concentration between the carcass 6 and the bead core 21, and a failure such as breakage of the carcass cord 6*c* may easily occur.

In contrast, when the distance Va in the tire radial direction from the bead core bottom surface 23 to the inner end portion 25*a* in the tire radial direction of the vertical line 25 is within the range of 20% or more and 35% or less with respect to the core height CH, the shape of the bead core 21 in which the vertical lines 25 are formed on the both sides in the tire width direction can be brought close to a shape along the shape of the carcass 6 folded back at the bead portion 20. This can more reliably reduce the occurrence of stress concentration between the carcass 6 and the bead core 21 and the occurrence of a failure such as breakage of the carcass cord 6*c* due to the stress concentration occurring between the carcass 6 and the bead core 21.

In addition, for the first layer 31*a*, the second layer 31*b*, and the third layer 31*c* counted from the innermost circumference side in the tire radial direction of the plurality of layers 31 formed by the bead wire 30 in the bead core 21, in two of the layers 31 adjacent to each other in the tire radial direction, the number of bead wires 30 in the layer 31 located relatively on the outer side in the tire radial direction is larger by two or more than the number of bead wires 30 in the layer 31 located on the inner side in the tire radial direction. This can make the contour shape of the bead core 21 from the first layer 31*a* to the third layer 31*c* in the tire meridian cross-section a shape having a small inclination angle in the tire radial direction with respect to the tire width direction. Accordingly, the cross-sectional shape of the bead core 21 at a position close to the bead core bottom surface 23 can be brought closer to a shape along the shape of the carcass 6 folded back at the bead portion 20.

In addition, for the first layer 31*a*, the second layer 31*b*, and the third layer 31*c* of the plurality of layers 31 formed by the bead wire 30, in two of the layers 31 adjacent to each other in the tire radial direction, the misalignment amount in the tire width direction between the bead wires 30 each located at an end portion on one side in the tire width direction is one-half of the thickness of the bead wire 30. This can suppress the excessively increasing misalignment amount in the tire width direction between the bead wires 30 at a portion straddling two of the layers 31 adjacent to each other in the tire radial direction and can suppress the loss of shape of the bead core 21 due to the excessively increasing misalignment amount between the bead wires 30 at the portion straddling two of the layers 31 adjacent to each other in the tire radial direction.

In addition, the side on which the misalignment amount between the bead wires 30 in the first layer 31*a* and the second layer 31*b* is one-half of the thickness of the bead wire 30 is located opposite in the tire width direction to the side on which the misalignment amount between the bead wires 30 located in the second layer 31*b* and the third layer 31*c* is one-half of the thickness of the bead wire 30. This can bring the contour shape of the bead core 21 from the first layer 31*a* to the third layer 31c of the bead core 21 in the tire meridian cross-section close to a shape along the shape of the carcass 6 folded back at the bead portion 20 in a well-balanced manner on the both sides in the tire width direction. Accordingly, the stress generated between the carcass 6 and the bead cores 21 can be more reliably dispersed, and the occurrence of a failure such as breakage of the carcass cord 6c due to the stress concentration occurring between the carcass 6 and the bead cores 21 can be more reliably reduced. As a result, the durability of the bead portion 20 can be improved.

In addition, the bead core 21 is formed in a shape in which the vertical line 25 is formed on the outer side in the tire width direction, allowing contact pressure between the rim wheel and a bead portion outer surface 45 (see FIG. 2), which is a surface on the outer side of the bead portion 20 in the tire width direction, to be made nearly uniform compared to a bead core having a substantially hexagonal cross-sectional shape. In other words, when the bead core has a substantially hexagonal cross-sectional shape, the bead core is formed having a portion on the outer side in the tire width direction having a corner portion projecting toward the outer side in the tire width direction, and thus the contact pressure between the rim wheel and the bead portion outer surface is high at the corner portion, whereas the contact pressure between the rim wheel and the bead portion outer surface is likely to be low at portions other than the corner portion. In this case, it may be difficult to secure air-sealing properties at a portion between the rim wheel and the bead portion outer surface when mounting the pneumatic tire on the rim wheel and inflating the pneumatic tire.

In contrast, in the present embodiment, the bead core 21 is formed in a shape in which the vertical line 25 is formed on the outer side in the tire width direction, allowing a change in the distance between the bead core 21 and the bead portion outer surface 45 to be reduced. In other words, an area of a portion where contact pressure on the rim wheel from the bead core 21 can be increased can be made larger. This allows for substantially uniform contact pressure between the rim wheel and the bead portion outer surface 45. As a result, air-sealing properties at the bead portion 20 can be improved.

In addition, the width CBW of the bead core bottom surface 23 in the tire meridian cross-section is within the range of 45% or more and 70% or less with respect to the maximum width CW of the bead core 21, allowing the occurrence of stress concentration between the bead core bottom surface 23 and the carcass 6 to be reduced. In other words, when the width CBW of the bead core bottom surface 23 is less than 45% with respect to the maximum width CW of the bead core 21, the width CBW of the bead core bottom surface 23 is too small, and thus the shape of the bead core 21 in the tire meridian cross-section may excessively project toward the lower side in the tire radial direction. In this case, stress concentration may be likely to occur between the carcass 6 and the bead core 21 at a location near the bead core bottom surface 23 of the bead core 21. In addition, when the width CBW of the bead core bottom surface 23 is larger than 70% with respect to the maximum width CW of the bead core 21, the width CBW of the bead core bottom surface 23 is too large, and thus stress concentration may be likely to occur between the carcass 6 and the bead core 21 at both end positions of the bead core bottom surface 23 in the width direction.

In contrast, when the width CBW of the bead core bottom surface 23 is within the range of 45% or more and 70% or less with respect to the maximum width CW of the bead core 21, the occurrence of stress concentration between the bead core bottom surface 23 and the carcass 6 can be effectively reduced. This can more reliably reduce the occurrence of a failure such as breakage of the carcass cord 6c due to the stress concentration occurring between the carcass 6 and the bead core 21. As a result, the durability of the bead portion 20 can be more reliably improved.

In addition, the bead core 21 has the distance Vb in the tire width direction between the end portion 22 in on the inner side in the tire width direction of the bead core top surface 22 and the vertical line 25 on the inner side in the tire width direction within the range of 10% or more and 25% or less with respect to the maximum width CW of the bead core 21 and the distance Vc in the tire width direction between the end portion 23 in on the inner side in the tire width direction of the bead core bottom surface 23 and the vertical line 25 on the inner side in the tire width direction within the range of 10% or more and 25% or less with respect to the maximum width CW of the bead core 21, allowing the stress concentration occurring between the carcass 6 and the bead core 21 to be more reliably reduced. In other words, when the distance Vb between the inner end portion 22 in in the tire width direction of the bead core top surface 22 and the vertical line 25 on the inner side in the tire width direction or the distance Vc between the inner end portion 23 in in the tire width direction of the bead core bottom surface 23 and the vertical line 25 on the inner side in the tire width direction is less than 10% with respect to the maximum width CW of the bead core 21, the projection amount of the bead core 21 from the position of the bead core top surface 22 or the bead core bottom surface 23 toward the inner side in the tire width direction may excessively decrease. In this case, the shape of a surface located on the inner side in the tire width direction of the bead core 21 in the tire meridian cross-section is less likely to be a shape along the curved shape of a portion located on the inner side in the tire width direction of the bead core 21 in the carcass 6, and this may cause stress concentration to easily occur between the carcass 6 and the bead core 21.

In addition, when the distance Vb between the inner end portion 22 in in the tire width direction of the bead core top surface 22 and the vertical line 25 on the inner side in the tire width direction or the distance Vc between the inner end portion 23 in in the tire width direction of the bead core bottom surface 23 and the vertical line 25 on the inner side in the tire width direction is larger than 25% with respect to the maximum width CW of the bead core 21, the projection amount of the bead core 21 from the position of the bead core top surface 22 or the bead core bottom surface 23 toward the inner side in the tire width direction may excessively increase. Also in this case, the shape of the surface located on the inner side in the tire width direction of the bead core 21 in the tire meridian cross-section is less likely to be a shape along the curved shape of a portion located on the inner side in the tire width direction of the bead core 21 in the carcass 6, and thus stress concentration may be likely to occur between the carcass 6 and the bead core 21.

In contrast, the distance Vb between the inner end portion 22 in in the tire width direction of the bead core top surface 22 and the vertical line 25 on the inner side in the tire width direction or the distance Vc between the inner end portion 23 in in the tire width direction of the bead core bottom surface 23 and the vertical line 25 on the inner side in the tire width direction is within the range of 10% or more and 25% or less with respect to the maximum width CW of the bead core 21. Accordingly, the shape of the surface located on the inner side in the tire width direction of the bead core 21 in the tire meridian cross-section can be easily made to be a shape along a curved shape of a portion located on the inner side in the tire width direction of the bead core 21 in the carcass 6. This can more reliably reduce the occurrence of stress concentration between the carcass 6 and the bead core 21. As a result, the durability of the bead portion 20 can be more reliably improved.

In addition, the bead core 21 has the maximum width CW of the bead core 21 within the range of 0.9 times or more and 1.4 times or less as large as the core height CH, and thus the occurrence of stress concentration between the carcass 6 and the bead core 21 can be more reliably reduced. In other words, when the maximum width CW of the bead core 21 is less than 0.9 times as large as the core height CH, the maximum width CW of the bead core 21 is too small. Accordingly, it is difficult to bring the shape of the bead core 21 in the tire meridian cross-section into a shape along the shape of the carcass 6 folded back around the bead core 21, and thus stress concentration may be likely to occur between the carcass 6 and the bead core 21. Specifically, when the maximum width CW of the bead core 21 is too small, stress concentration may be likely to occur between the bead core 21 and a portion located near the bead core bottom surface 23 in the carcass 6 folded back around the bead core 21.

In addition, when the maximum width CW of the bead core 21 is 1.4 times larger than the core height CH, the maximum width CW of the bead core 21 is too large, also in this case, it is difficult to bring the shape of the bead core 21 in the tire meridian cross-section into a shape along the shape of the carcass 6, and thus stress concentration may be likely to occur between the carcass 6 and the bead core 21. Specifically, the maximum width CW of the bead core 21 is too large, and thus stress concentration may be likely to occur between the bead core 21 and a portion located near either side in the tire width direction of the bead core 21 in the carcass 6 folded back around the bead core 21.

In contrast, when the maximum width CW of the bead core 21 is within the range of 0.9 times or more and 1.4 times or less as large as the core height CH, the shape of the bead core 21 in the tire meridian cross-section can be brought close to a shape along the shape of the carcass 6 folded back around the bead core 21. This can more reliably reduce the occurrence of stress concentration between the carcass 6 and the bead core 21. As a result, the durability of the bead portion 20 can be more reliably improved.

Further, in the carcass 6, the number of ends of the carcass cords 6c at a position on the inner side of the bead core 21 in the tire width direction is within a range of 10 cords per 50 mm or more and 20 cords per 50 mm or less. Therefore, failure of the carcass 6 at the position of the bead portion 20 can be more reliably reduced. That is, when the number of ends of the carcass cords 6c at the position on the inner side of the bead core 21 in the tire width direction is less than 10 cords per 50 mm, the number of ends of the carcass cords 6c is too small. Therefore, when a large tension acts on the carcass 6, the tension borne by each carcass cord 6c may excessively increase. In this case, in a portion of the carcass 6 disposed in the bead portion 20, stress per one carcass cord 6c excessively increases, and the carcass cord 6c may be likely to be broken. Further, when the number of ends of the carcass cords 6c at a position on the inner side of the bead core 21 in the tire width direction is more than 20 cords per 50 mm, the number of ends of the carcass cords 6c is too large. Therefore, the intervals between the carcass cords 6c decrease, and the volume of the coating rubber 6d positioned between the adjacent carcass cords 6c may excessively decrease. In this case, since it is difficult to hold the carcass cord 6c by the coating rubber 6d and the carcass cord 6c is likely to be peeled off from the coating rubber 6d, it may be difficult to manufacture the carcass 6 with appropriate durability.

In contrast, when the number of ends of the carcass cords 6c at the position on the inner side of the bead core 21 in the tire width direction is within the range of 10 cords per 50 mm or more and 20 cords per 50 mm or less, the volume of the coating rubber 6d positioned between the adjacent carcass cords 6c can be suppressed from excessively decreasing, and the force borne by the carcass cords 6c can be dispersed to more carcass cords 6c. As a result, the peeling off of the carcass cord 6c from the coating rubber 6d is reduced, and when a large tension acts on the carcass 6 at the position of the bead portion 20, the tension borne by each carcass cord 6c can be reduced, allowing an easy breakage of the carcass cord 6c due to an excessively large stress of each carcass cord 6c to be reduced. Therefore, the durability of the carcass 6 can be ensured, and the failure of the carcass 6 at the position of the bead portion 20 can be more reliably reduced. As a result, the durability of the bead portion 20 can be more reliably improved.

In a method of manufacturing the pneumatic tire 1 according to the embodiment, the bead core 21 is formed such that a portion located on the innermost side in the tire width direction and a portion located on the outermost side in the tire width direction of the bead core 21 are the vertical lines 25, allowing, even when a large force acts between the carcass 6 and the bead core 21 due to a large tension acting on the carcass 6, the occurrence of stress concentration to be reduced. As a result, the occurrence of a failure such as breakage of the carcass cord 6c due to the stress concentration occurring between the carcass 6 and the bead core 21 can be reduced.

In addition, in the method of manufacturing the pneumatic tire 1 according to the embodiment, the length CV of the vertical line 25 is made to fall within the range of 31% or more and 45% or less with respect to the core height CH, allowing the stress generated between the carcass 6 and the bead core 21 to be more reliably dispersed by the vertical lines 25 formed on the both sides of the bead core 21 in the tire width direction. This can more reliably reduce the occurrence of a failure such as breakage of the carcass cord 6c due to the stress concentration occurring between the carcass 6 and the bead core 21.

In addition, in the method of manufacturing the pneumatic tire 1 according to the embodiment, the distance Va in the tire radial direction from the bead core bottom surface 23 to the inner end portion 25a in the tire radial direction of the vertical line 25 is made to fall within the range of 20% or more and 35% or less with respect to the core height CH, allowing the shape of the bead core 21 to be brought close to a shape along the shape of the carcass 6 folded back at the bead portion 20. This can more reliably reduce the occurrence of stress concentration between the carcass 6 and the bead core 21.

In the method of manufacturing the pneumatic tire 1 according to the embodiment, for the first layer 31a, the second layer 31b, and the third layer 31c of the plurality of layers 31 formed by the bead wire 30, in two of the layers 31 adjacent to each other, the misalignment amount in the tire width direction between the bead wires 30 each located at the end portion on one side in the tire width direction is made to be one-half of the thickness of the bead wire 30. This can reduce the excessively increasing misalignment amount in the tire width direction between the bead wires 30 at a portion straddling the two layers 31 adjacent to each other in the tire radial direction and can reduce the loss of shape of the bead core 21.

In the method of manufacturing the pneumatic tire 1 according to the embodiment, the side on which the misalignment amount between the bead wires 30 in the first layer 31a and the second layer 31b is made to be one-half of the thickness of the bead wire 30 is made opposite in the tire width direction to the side on which the misalignment amount between the bead wires 30 in the second layer 31b and the third layer 31c is made to be one-half of the thickness of the bead wire 30. This can bring the shape of the bead core 21 in the tire meridian cross-section close to a shape along the shape of the carcass 6 in a well-balanced manner on the both sides in the tire width direction, can reduce the generation of stress concentration between the carcass 6 and the bead core 21, and thus can more reliably reduce the occurrence of a failure such as breakage of the carcass cord 6c. As a result, the durability of the bead portion 20 can be improved.

In addition, in the method of manufacturing the pneumatic tire 1 according to the embodiment, the bead wire 30 starts to be wound from the end portion on the outer side in the tire width direction in the first layer 31a, and thus the durability of the bead core 21 can be ensured. In other words, when the pneumatic tire 1 is inflated, the bead core 21 is required to have the highest strength at the position of the end portion 23 in on the inner side in the tire width direction on the bead core bottom surface 23. Thus, the end portion of the bead wire 30 located at the position of the end portion 23 in on the inner side in the tire width direction on the bead core bottom surface 23 decreases the durability of the bead core 21, and the bead core 21 may be likely to lose its shape.

In contrast, when the bead wire 30 starts to be wound from the end portion on the outer side in the tire width direction in the first layer 31a, the strength at the position of the end portion 23 in on the inner side in the tire width direction on the bead core bottom surface 23 where the highest strength is required can be ensured, allowing the likelihood of loss of shape of the bead core 21 to be reduced. As a result, the durability of the bead core 21 can be ensured.

MODIFIED EXAMPLES

Note that in the pneumatic tire 1 according to the embodiment described above, in the bead core 21, the number of the bead wires 30 in the layer 31 decreases by one toward the outer side in the tire radial direction on the further outer side in the tire radial direction than the layer 31 including the bead wire 30 forming the end portion on the outer side in the tire radial direction of the vertical line 25. However, the bead core 21 may be formed in a form other than this.

Figure 5:
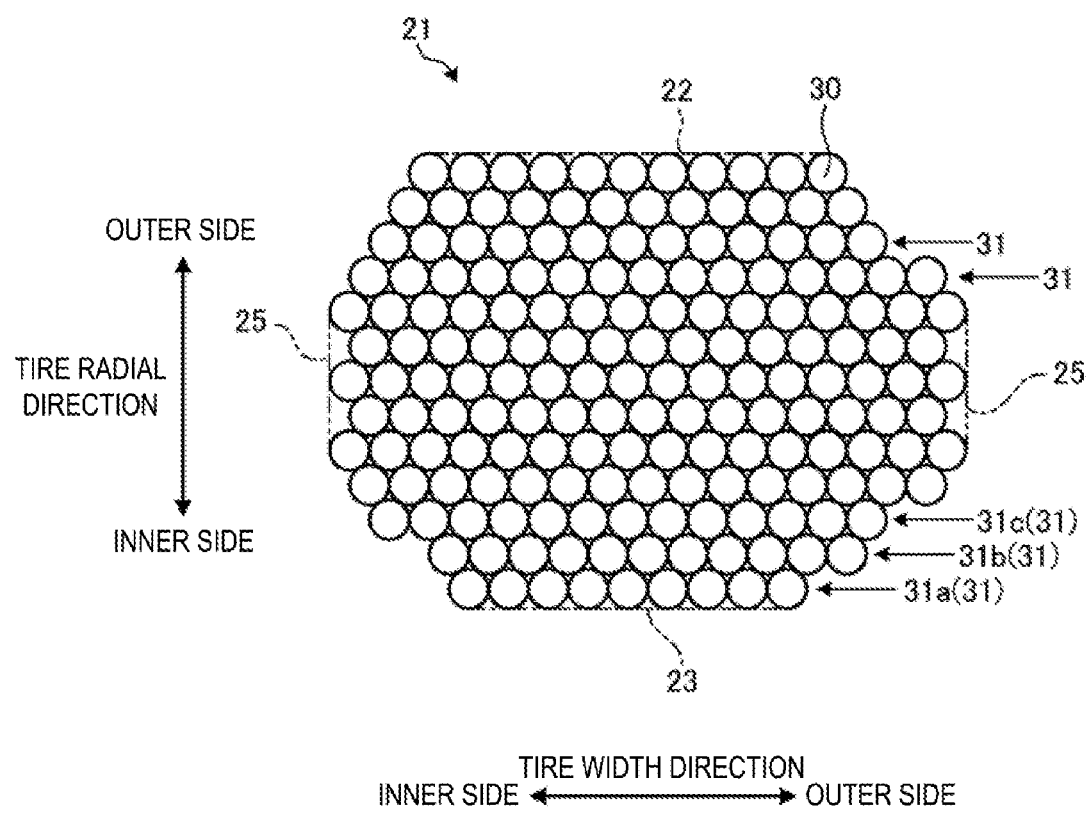
FIG. 5 is a detailed view of the bead core of a modified example of the pneumatic tire according to the embodiment, in which bead wires are layered in a different form from the embodiment illustrated in FIG. 3.

FIG. 5 is a detailed view of the bead core 21 of a modified example of the pneumatic tire 1 according to the embodiment, in which the bead wires 30 are layered in a different form from the embodiment described above. For example, as illustrated in FIG. 5, in two of the layers 31 adjacent to each other in the tire radial direction on the further outer side in the tire radial direction than the vertical line 25, the bead core 21 may have a portion where the number of bead wires 30 in the layer 31 located relatively on the outer side in the tire radial direction is smaller by two than the number of bead wires 30 in the layer 31 located on the inner side in the tire radial direction. The form of the portion on the further outer side in the tire radial direction than the vertical line 25 is not limited, as long as the bead core 21 is formed to have a cross-sectional shape close to an octagon when viewed in a tire meridian cross-section, and the first layer 31a, the second layer 31b, and the third layer 31c counted from the innermost circumference in the tire radial direction among the plurality of layers 31 formed by the bead wire 30 are formed as in the embodiment described above.

In addition, in the pneumatic tire 1 according to the embodiment described above, three reinforcing layers 60 are disposed; however, the reinforcing layers 60 with the number of layers other than three may be disposed. The number of the reinforcing layers 60 and the range in which the reinforcing layers 60 are disposed in the tire meridian cross-section may be different from the number and the range of the reinforcing layers 60 in the embodiment described above.

EXAMPLES

FIGS. 6A-6F are tables indicating results of performance evaluation tests of pneumatic tires. Hereinafter, performance evaluation tests conducted on a pneumatic tire of Conventional Example and pneumatic tires 1 according to the embodiments of the present technology will be described. In the performance evaluation tests, durability tests for evaluating the durability of the pneumatic tire 1 were conducted.

In the performance evaluation tests, the pneumatic tire 1 having a tire nominal size of 37.25R35 was used as a test tire. The test tire was mounted on a rim wheel conforming to the TRA standard, the air pressure was adjusted to an air pressure defined in the TRA standard, and the tests were conducted with the tire subjected to a load specified by the TRA standard.

In the evaluation method for durability, a running test was conducted using an indoor drum testing machine with a load set to 120% of the maximum load specified by the TRA and a speed set to 10 km/h, and the durability was evaluated by expressing the breakage rate of the strand wires of the carcass cord in the bead portion when the pneumatic tire was run for 300 hours by an index with the conventional example described below being 100. With respect to the breakage rate of the strand wire, 40 carcass cords in the bead portion at the end of running were sampled at arbitrary positions, all the sampled carcass cords were observed, and the average value of (the number of broken strand wires in each carcass cord/the total number of strand wires in each carcass cord) was defined as the breakage rate.

The performance evaluation test was conducted on 24 types of pneumatic tires, in other words, the pneumatic tires of Conventional Example, which was an example of a known pneumatic tire, and Examples 1 to 23, which were the pneumatic tires 1 according to the embodiment of the present technology. Of these pneumatic tires, the pneumatic tire of Conventional Example has a substantially hexagonal cross-sectional shape of the bead core in the tire meridian cross-section, and the bead core does not have vertical lines on the innermost side and the outermost side in the tire width direction.

In contrast, in all of Examples 1 to 23 corresponding to examples of the pneumatic tires 1 according to the embodiment of the present technology, the bead core 21 has the vertical lines 25 on the innermost side and the outermost side in the tire width direction, the length CV of the vertical line 25 of the bead core 21 is within the range of 31% or more and 45% or less with respect to the core height CH of the bead core 21, and the distance Va from the bead core bottom surface 23 to the inner end portion 25a of the vertical line 25 is within the range of 20% or more and 35% or less with respect to the core height CH. In addition, in the pneumatic tires 1 according to Examples 1 to 23, the ratio (CBW/CW) of the width CBW of the bead core bottom surface 23 to the maximum width CW of the bead core 21, the ratio (Vb/CW) of the distance Vb between the vertical line 25 on the inner side in the tire width direction and the end portion 22 in of the bead core top surface 22 to the maximum width CW of the bead core 21, the ratio (Vc/CW) of the distance Vc between the vertical line 25 on the inner side in the tire width direction and the end portion 23 in of the bead core bottom surface 23 to the maximum width CW of the bead core 21, the ratio (CW/CH) of the maximum width CW of the bead core to the core height CH, and the number of ends of the carcass cords 6c at the position on the inner side of the bead core 21 in the tire width direction are different from each other, respectively.

As a result of the performance evaluation tests using the pneumatic tires 1, as illustrated in FIGS. 6A-6F, it has been found that the pneumatic tires 1 according to Examples 1 to 23 have better breakage rates of the strand wires of the carcass cords 6c of the bead portions 20 compared to the Conventional Example, and also breakages of the carcass cords 6c in the bead portions 20 are less likely to occur. In other words, the pneumatic tires 1 according to Examples 1 to 23 can provide improved durability of the bead portion 20.

The invention claimed is:

1. A pneumatic tire, comprising:
a pair of bead portions disposed on both respective sides of a tire equatorial plane in a tire width direction;
a bead core disposed in each of the pair of bead portions, formed by winding a bead wire into a ring shape, and having a polygonal cross-sectional shape in a tire meridian cross-section; and
a carcass comprising a carcass body portion disposed extending between the pair of bead portions and a turned-up portion that is formed continuously from the carcass body portion and is folded back from an inner side in the tire width direction to an outer side in the tire width direction of each of the bead cores, the carcass being formed by coating a carcass cord with a coating rubber;
each of the bead cores having a portion located on an innermost side in the tire width direction and a portion located on an outermost side in the tire width direction in a contour in the tire meridian cross-section each formed as a vertical line extending along a tire radial direction, where each vertical line is defined as an imaginary straight line contacting a plurality of exposed portions of the bead wire respectively located at the innermost side and the outermost side in the tire width direction,
each vertical line having a length within a range of 31% or more and 45% or less with respect to a core height that is a height of each of the bead cores in the tire radial direction, the length of each vertical line extending from a radially innermost exposed portion of the bead wire contacting the vertical line to a radially outermost exposed portion of the bead wire contacting each vertical line on each of the innermost side and the outermost side, respectively,
each vertical line having a distance in the tire radial direction from a bead core bottom surface that is an inner circumferential surface of each of the bead cores, respectively to an inner end portion in the tire radial direction of each respective vertical line within a range of 20% or more and 35% or less with respect to the core height,
in each of the bead cores, a plurality of circumferential portions of the bead wire wound in the ring shape being aligned in the tire width direction to form a plurality of layers being layered in the tire radial direction, and
a number of the bead wires in each of the layers decreases by only one from a layer including the bead wires forming an end portion on an outer side in the tire radial direction toward an outer side in the tire radial direction on a further outer side in the tire radial direction of the layer including the bead wires forming the end portion on the outer side in the tire radial direction of each vertical line in the plurality of layers to a radially outermost layer including the bead wires in the tire radial direction,
in layers of each of the bead cores located on an inner side in the tire radial direction of a layer including the bead wire forming an inner end of each vertical line, in two layers adjacent to each other in the tire radial direction, a number of the bead wires in the layer located relatively on the outer side in the tire radial direction being larger by two or more than a number of the bead wires in a layer located on the inner side in the tire radial direction, and a misalignment amount in the tire width direction between the bead wires located at an end portion on one side in the tire width direction being one-half of the bead wire, and
for a first layer that is located on an innermost circumference in the tire radial direction, a second layer that is layered adjacent to an outer side of the first layer in the tire radial direction, and a third layer that is layered adjacent to an outer side of the second layer in the tire radial direction of the plurality of the layers, a side on which a misalignment amount between the bead wires in the first layer and the second layer is one-half of the bead wire being opposite in the tire width direction to a side on which a misalignment amount between the bead wires in the second layer and the third layer is one-half of the bead wire.

2. The pneumatic tire according to claim 1, wherein each of the bead cores has a width of the bead core bottom surface in the tire meridian cross-section within a range of 45% or more and 70% or less with respect to a maximum width of each of the bead cores.

3. The pneumatic tire according to claim 2, wherein
each of the bead cores has a distance in the tire width direction between an end portion on an inner side in the tire width direction on a bead core top surface that is an outer circumferential surface in the tire meridian cross-section and the vertical line on the inner side in the tire width direction within a range of 10% or more and 25% or less with respect to the maximum width of each of the bead cores,
has a distance in the tire width direction between an end portion on the inner side in the tire width direction on the bead core bottom surface and the vertical line on the inner side in the tire width direction within a range of 10% or more 25% or less with respect to the maximum width of each of the bead cores, and
has the maximum width of each of the bead cores within a range of 0.9 times or more and 1.4 times or less as large as the core height.

4. The pneumatic tire according to claim 3, wherein the carcass has the number of ends of the carcass cords at a position on the inner side in the tire width direction of each of the bead cores within a range of 10 cords per 50 mm or more and 20 cords per 50 mm or less.

5. The pneumatic tire according to claim 1, wherein
each of the bead cores has a distance in the tire width direction between an end portion on an inner side in the tire width direction on a bead core top surface that is an outer circumferential surface in the tire meridian cross-section and the vertical line on the inner side in the tire width direction within a range of 10% or more and 25% or less with respect to a maximum width of each of the bead cores, has a distance in the tire width direction between an end portion on the inner side in the tire width direction on the bead core bottom surface and the vertical line on the inner side in the tire width direction within a range of 10% or more and 25% or less with respect to the maximum width of each of the bead cores, and has the maximum width of each of the bead cores within a range of 0.9 times or more and 1.4 times or less as large as the core height.

6. The pneumatic tire according to claim 1, wherein the carcass has the number of ends of the carcass cords at a position on the inner side in the tire width direction of each of the bead cores within a range of 10 cords per 50 mm or more and 20 cords per 50 mm or less.

7. The pneumatic tire according to claim 1, wherein a reinforcing layer is disposed in the pair of bead portions along the carcass at least inside the carcass body portion in the tire width direction, in the reinforcing layer, a plurality of reinforcing layers each having a plurality of cords are arranged in a stacked manner, in the plurality of reinforcing layers, inclination directions of the plurality of cords in the tire circumferential direction with respect to the tire radial direction are opposite to each other between adjacent reinforcing layers.

* * * * *